United States Patent [19]
Ettischer et al.

[11] 3,730,066
[45] May 1, 1973

[54] FILM MOVEMENT PREVENTION MEANS

[75] Inventors: Helmut Ettischer; Wolfgang Ort; Horst Simon; Kurt Steisslinger, all of 7 Stuttgart 60 Wangen, Germany

[73] Assignee: Eastman Kodak Company, Rochester, N.Y.

[22] Filed: June 5, 1972

[21] Appl. No.: 259,828

[30] Foreign Application Priority Data

Oct. 14, 1971 Germany ................... G 71 38 818.6

[52] U.S. Cl. .............. 95/31 R, 95/31 FM, 95/31 AC, 226/59
[51] Int. Cl. .............................................. G03b 1/42
[58] Field of Search ............. 95/31 R, 31 FM, 31 AC; 226/59, 147, 149, 58

[56] References Cited
UNITED STATES PATENTS

| 645,370 | 3/1900 | McCurdy | 235/91 |
| 1,984,134 | 12/1934 | Kraft | 226/58 |
| 2,419,759 | 4/1947 | Briskin et al. | 226/59 |
| 3,605,597 | 9/1971 | Katsuyama | 95/31 R |

*Primary Examiner*—Robert P. Greiner
*Attorney*—W. H. J. Kline et al.

[57] ABSTRACT

A camera includes transport means operable for advancing received film which is perforated at predetermined metering intervals along an exposure plane, a metering mechanism operable to disable the transport means and a film sensing pawl movable into a film perforation to operate the metering mechanism and movable from the perforation after the transport means has been disabled. A film holding member is movable into a film perforation when the transport means has been disabled to prevent film movement along the exposure plane.

6 Claims, 3 Drawing Figures

FILM MOVEMENT PREVENTION MEANS

CROSS-REFERENCE TO RELATED APPLICATIONS

Reference is made to commonly assigned, copending U.S. Pat. applications, Ser. No. 203,732, entitled Film Advance And Metering Mechanism For Cameras, filed in the name of Alexander A. Peters on Dec. 1, 1971, and Ser. No. 209,209, entitled Film Creep Preventing Means For Cameras, filed in the name of David E. Beach on Dec. 17, 1971.

BACKGROUND OF THE INVENTION

1. Field of the Invention

The present invention relates to devices for metering perforated film in roll film cameras, and more particularly to means for eliminating or reducing the risk of film movement after the film has been advanced.

2. Description of the Prior Art

Devices for metering successive roll film exposures by arresting the film winding mechanism in response to the sensing of perforations or notches precut in the film at specific intervals are old and well known in the art. In many such devices, the perforation sensing member remains in the perforation after the film has been advanced and is removed from the perforation during the exposure operation of the camera. It has been found that devices of this type may cause camera movement during exposure due to the requirement of sufficient force on the shutter release lever to withdraw the sensing member from the perforation. In other camera metering devices, the sensing member remains in the perforation during exposure and is spring biased against the trailing edge of the film perforation and film movement along the camera's exposure plane can occur during the exposure operation if camera vibrations cause momentary relaxation of frictional forces between the camera and the film.

To overcome the above-mentioned problems, cameras have been designed wherein the perforation sensing member is removed from the perforation immediately following the film advance operation. In coassigned, copending U.S. Pat. application, Ser. No. 203,732, entitled Film Advance And Metering Mechanism For Cameras, filed in the name of Alexander A. Peters on Dec. 1, 1971, a film sensing pawl is not removed from the perforation by the shutter release lever, but rather it is removed immediately after the film has been advanced by the film transport mechanism. It has been found that in cameras of the type disclosed in the Peters application, wherein the film sensing pawl is withdrawn from the perforation after the film has been advanced, there is a possibility that the film may move along the exposure plane toward the camera's take-up chamber because of torsional forces on the take-up film roll. Normally, the static frictional forces on the film from camera and cartridge parts is sufficient to prevent such movement. However, if the camera is vibrated or jarred, such as for example by normal road vibrations in an automobile, the static friction may be overcome and the film may move or creep toward the take-up chamber.

When a camera in which the film has moved in this manner is used to take a picture, the exposure may slightly overlap the next succeeding exposure, producing a less satisfactory result. Further, since processors normally cut roll film at positions determined by the perforations in the film, and since the exposure frame of film which has crept will be misaligned with the corresponding perforation, a portion of that frame will be cut away and will appear in the next frame.

To overcome this problem, coassigned U.S. Pat. application, Ser. No. 209,209 entitled Film Creep Preventing Means For Cameras, filed in the name of David E. Beach on Dec. 17, 1971 discloses a member movable into contact with the film surface after the film has been advanced to prevent the film from moving along the exposure plane. Although mechanism disclosed in the aforementioned Beach application reduces the risk of film movement between film advancement and exposure, the present invention provides a more positive engagement of the film so as to more positively prevent such movement.

SUMMARY OF THE INVENTION

It is an object of the present invention to provide improved apparatus for preventing film movement in still cameras.

A further object of the present invention is to provide a mechanism for preventing film movement in cameras wherein a film holding member is movable into a perforation after the film transport mechanism has been disabled to thereby engage the edges of the perforation for preventing film movement.

In accordance with the above objects, a preferred embodiment of the present invention includes a camera having transport means operable for advancing received film along an exposure plane, a metering mechanism operable for disabling the transport means after the film has been advanced and a film sensing pawl movable into a film perforation to detect the presence of a perforation at a predetermined position and movable out of the perforation upon operation of the metering mechanism. A film holding member is movable between an active position transversing the exposure plane through a perforation and an inactive position on one side of the exposure plane. Means are provided for moving the holding means to its inactive position during operation of the film transport means and for moving the holding means to its active position, at least during the interval between operation of the metering mechanism to disable the transport means and operation of the camera's exposure mechanism, whereby the film is prevented from moving along the exposure plane as long as the film holding member is in its active position.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because cameras are well known, the present description will be directed in particular to elements forming part of, or cooperating more directly with apparatus in accordance with the present invention. It is to be understood that camera elements not specifically shown or described may take various forms well known to those skilled in the art.

Figure 1:
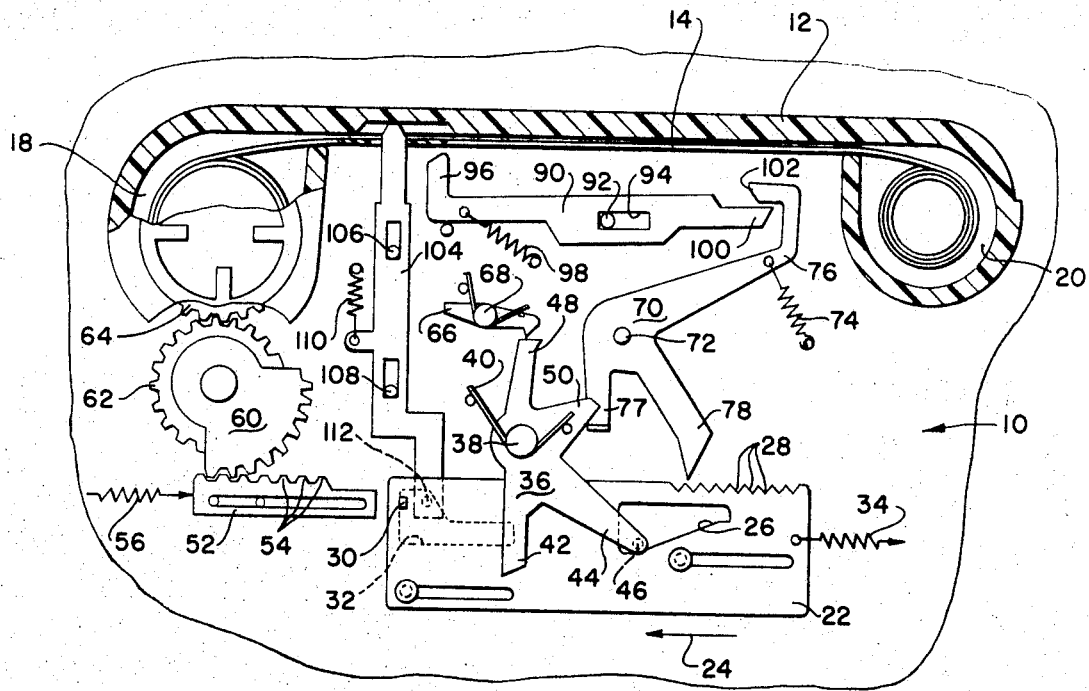
FIG. 1 is a view of a portion of a camera in accordance with the present invention wherein the camera elements are arranged after an exposure has been made.

Referring now to FIG. 1, the camera illustrated therein includes a housing 10 into which a film cartridge 12 containing perforated roll film 14 has been loaded. The film may be backed by opaque paper and the cartridge may be of the type shown in coassigned U.S. Pat. No. 3,138,081 which issued on June 23, 1964 to Hubert Nerwin, and includes take-up and supply chambers 18 and 20, respectively.

A film advance slide 22 is mounted in camera 10 by a pin-and-slot arrangement so that as to be movable from the position shown in FIG. 1 in the direction of arrow 24. Slide 22 has an opening 26, a plurality of ratchet teeth 28, an abutment 30 and a second opening 32 thereon. A spring 34 urges slide 22 to the right as viewed in FIG. 1.

A shutter drive member 36 is rotatably carried on a stud 38 in housing 10 and is biased in a clockwise direction as viewed in FIG. 1 by a spring 40. An arm 42 on drive member 36 actuates a shutter, not shown, during clockwise rotation of the drive member to effect an exposure. A second arm 44 of the drive member carries a stud 46 which extends into opening 26 of slide 22 to follow, during movement of the slide in the direction of arrow 24, the cam surface which defines the lower boundary of opening 26, thereby rotating drive member 36 in a counterclockwise direction against the force of spring 40. The function of two other arms 48 and 50 on drive member 36 will be explained hereinafter.

A rack 52 having a plurality of gear teeth 54 is slidably mounted on housing 10 and is urged by a spring 56 to the right as viewed in FIG. 1. Teeth 54 mesh with corresponding teeth on a gear sector 60 which, through gears 62 and 64, advances film from supply compartment 20 to take-up compartment 18 when rack 52 is moved to the left. Gear sector 60 may be connected to gear 62 by a one-way clutch so that gears 62 and 64 do not turn when rack 52 is moved to the right.

A latch member 66 is pivotally mounted in housing 10 on a stud 68 for movement between a latch position (retaining drive member 36 in its cocked position shown in FIG. 3) and a release position (permitting spring 40 to rapidly move the drive member to its uncocked position shown in FIG. 1).

An intermediate member 70 is rotatably carried in housing 10 on a stud 72 and is biased in a clockwise direction by a spring 74. Intermediate member 70 has three arms, 76–78.

A film sensing member 90 is rotatably and slidably carried by a pin 92 which extends into a slot 94 in the sensing member. A film sensing pawl 96 on the sensing member extends toward film 14 and the camera's exposure plane. A spring 98 urges the sensing pawl away from the film and the sensing member to the right. A tab 100 is provided on the right end of sensing member 90 to engage a tab 102 on arm 76 of intermediate member 70.

A film holding member 104 is slidably mounted in housing 10 on a pair of pins 106 and 108 which extend into a pair of slots in the holding member. A spring 110 urges holding member upwardly as viewed in FIG. 1, and a pin 112 extends into opening 32 of slide 22.

OPERATION

FIG. 1 shows the camera elements positioned after an exposure has been made. The camera is now ready to be operated to cock the shutter mechanism and advance film to the next picture frame. The operator manually moves slide 22 in the direction of arrow 24 against the force of spring 34. As the slide begins to move, pin 46 engages the cam surface of opening 26, causing shutter drive member 36 to rotate in a counterclockwise direction against the force of spring 40 until arm 48 thereon snaps behind latch member 66. As drive member 36 rotates, its arm 50 moves to permit intermediate member 70 to rotate in a clockwise direction by the force of spring 74 to pull tab 102 downwardly and to thereby rotate sensing member 90 in a clockwise direction until sensing pawl 96 rests on the film surface.

Figure 2:
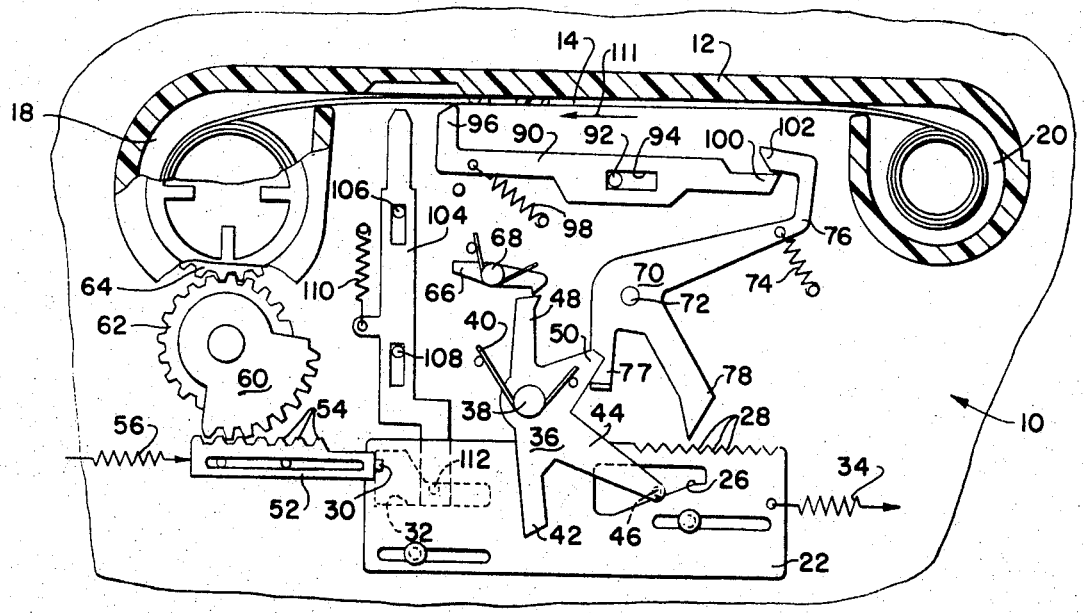
FIG. 2 is a view of the portion of the camera shown in FIG. 1 showing the positions of the camera elements during initial film advance.

During initial movement on slide 22, pin 112 on film holding member 104 engages an inclined edge of opening 32 in the slide to cause movement of the holding member against the force of spring 110, thereby withdrawing the holding member from the film perforation. After the holding member has cleared the perforation, abutment 30 on slide 22 engages rack 52 so that continued movement of the slide will cause rotation of gears 60, 62 and 64 to advance film 14 in the direction of arrow 111 along the camera's exposure plane. FIG. 2 shows the positions of the camera elements as the film is being advanced.

As the next succeeding perforation reaches the position of film sensing pawl 96, the pawl will drop into the perforation so that sensing member 90 is carried by the advancing film to the left. When sensing pawl 96 reaches the position of film holding member 104, tab 102 on intermediate member 70 drops off of tab 100 on the sensing member so that spring 74 rotates the intermediate member in a clockwise direction until the nose of arm 78 engages ratchet teeth 28 to prevent further movement of the slide in the direction of arrow 24. Tab 100, having fallen off of tab 102, no longer holds the sensing member against the force of spring 98 and that spring now rotates the sensing member in a counterclockwise direction to withdraw sensing pawl 96 from the perforation, leaving the sensing member free to move to the right. When the operator releases slide 22, spring 34 moves the slide to the right and film holding member is moved into the perforation by spring 110 to secure the film and to prevent further film movement until withdrawn during the next frame advance operation. The camera elements are now positioned as shown in FIG. 3, and the camera is ready to be operated to make an exposure.

Figure 3:
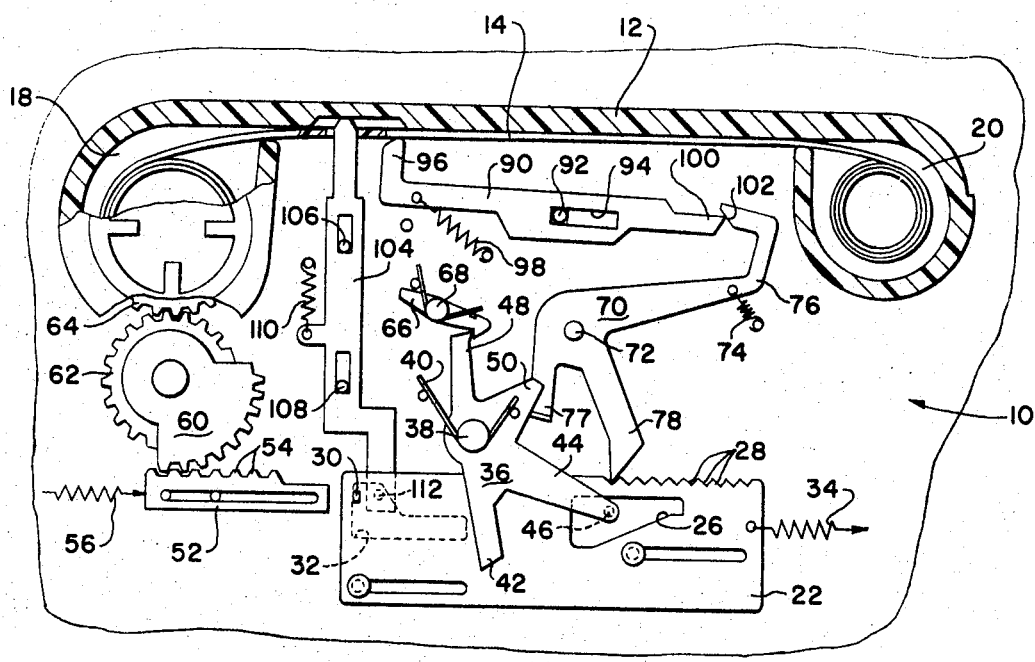
FIG. 3 is a view of the portion of the camera shown in FIG. 1 showing the positions of the camera elements after the film has been advanced and the camera is ready to make an exposure.

To make an exposure, latch 66 is rotated in a clockwise direction (by the camera's body release member, not shown) releasing drive lever 36 to run down in a clockwise direction from its FIG. 3 position to operate the shutter mechanism by arm 42. During such running down movement of the drive member, its arm 50 engages the tab on arm 77 of intermediate member 70 to rotate the intermediate member in a counterclockwise direction, thereby removing the end of arm 78 from ratchet teeth 28 of slide 22. The camera elements are now in their respective positions shown in FIG. 1, and the camera is ready to be operated to recock the shutter and advance the next succeeding film frame to the exposure station as hereinbefore described.

In cameras wherein more than one film perforation is available, the holding member may be arranged to enter a different perforation than the sensing pawl.

The invention has been described in detail with particular reference to a preferred embodiment, but it will be understood that variations and modifications can be effected within the spirit and scope of the invention.

We claim:

1. In a camera having (1) a housing including a space for receiving roll film perforated at predetermined metering intervals, (2) means defining an exposure plane, (3) transport means operable for advancing received film along said exposure plane, and (4) metering means including a sensing pawl for detecting the presence of a film perforation at a predetermined position along said exposure plane; the improvement comprising:

a film holding member mounted in said camera for movement between an active position transversing said exposure plane through a perforation in received film and an inactive position on one side of said exposure plane; and means (1) for moving said holding member to its inactive position upon initial operation of said transport means and (2) for moving said holding member toward its active position when said transport means is not being operated.

2. The improvement as defined in claim 1 wherein said moving means comprises:

spring means for urging said holding member toward its active position; and means interconnecting said holding member and said transport means for moving said holding member toward its inactive position during operation of said transport means.

3. In a camera having (1) a housing including space for receiving roll film perforated at predetermined metering intervals, (2) means defining an exposure plane, (3) transport means operable for advancing received film along said exposure plane, (4) a metering mechanism operable for disabling said transport means, (5) a film sensing pawl movable into a film perforation to detect the presence of the perforation at a predetermined position and movable out of the perforation upon operation of said metering mechanism, and (6) means operable for effecting exposure of film at said exposure plane; the improvement comprising:

a film holding member movable between an active position transversing said exposure plane through a perforation in received film and an inactive position on one side of said exposure plane;

means for moving said holding member to its inactive position upon initial operation of said transport means, whereby film may be advanced; and means for moving said said holding to its active position at least during the interval between (1) operation of said metering mechanism to disable said transport means and (2) operation of said exposure effecting means, whereby the film is prevented from moving along said exposure plane.

4. The improvement as defined in claim 3 wherein said holding member is positioned to enter the perforation at said predetermined position.

5. The improvement as defined in claim 3 wherein:

said transport means includes an advance member movable from a rest position to advance film; and said means for moving said holding member to its inactive position includes means interconnecting said holding member and said advance member for moving said holding member to its inactive position upon movement of said advance member to its rest position.

6. The improvement as defined in claim 7 wherein said means for moving said holding member to its active position comprises a spring.

* * * * *